Oct. 16, 1934.　　J. S. MONTAINE　　1,976,742
MILLING MACHINE
Filed Nov. 7, 1930　　5 Sheets-Sheet 4

INVENTOR.
JOHN S. MONTAINE.
BY
*H. C. Karel.*
ATTORNEY.

Oct. 16, 1934.    J. S. MONTAINE    1,976,742
MILLING MACHINE
Filed Nov. 7, 1930    5 Sheets-Sheet 5

INVENTOR.
JOHN S. MONTAINE.
BY
*H.C. Karel.*
ATTORNEY.

Patented Oct. 16, 1934

1,976,742

UNITED STATES PATENT OFFICE 1,976,742

MILLING MACHINE

John S. Montaine, Hamilton, Ohio

Application November 7, 1930, Serial No. 493,958

2 Claims. (Cl. 90—21)

My invention relates to milling machines but more particularly to a multiple spindle milling machine of the station type, in which the work travels in a vertical plane and is acted upon by the radially arranged cutters in both the up stroke and down stroke. The vertical moving work table is indexed at the end of each stroke to a position where the work can be unloaded and another piece of work be secured thereon, or the work can be presented to another cutter for a second operation.

The object of my invention is to provide a milling machine with a plurality of cutters spaced about a vertically moving work support, whereby the cutters act upon the work in both the up and down stroke of the work support. A further object is to provide the machine with means for indexing the work support. A further object is to provide the machine with a centrally hung shaft upon which the work support reciprocates. A still further object is to provide fluid means for reciprocating the work support.

Still further objects will be apparent as the description progresses.

My invention will be further readily understood from the following description and claims, and from the drawings in which latter:

Figure 1:
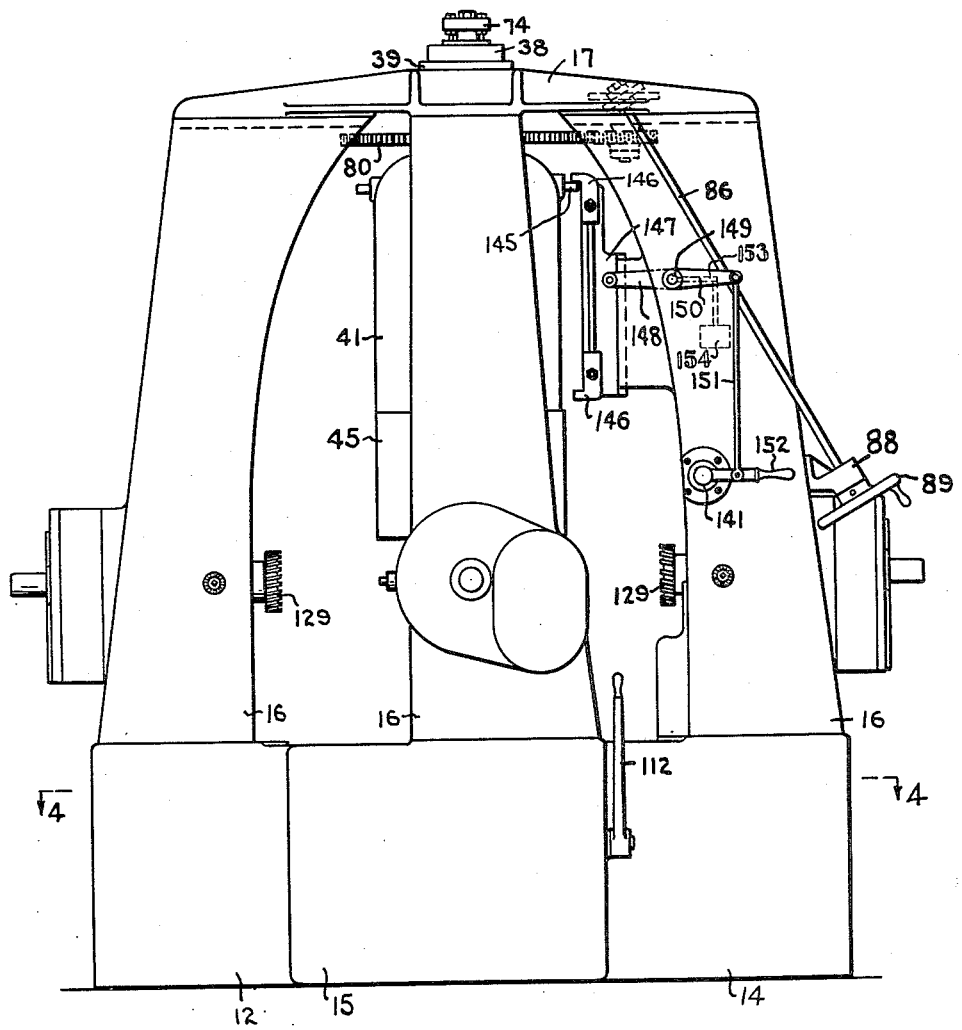
Fig. 1 is a front view of the machine.
Figure 2:
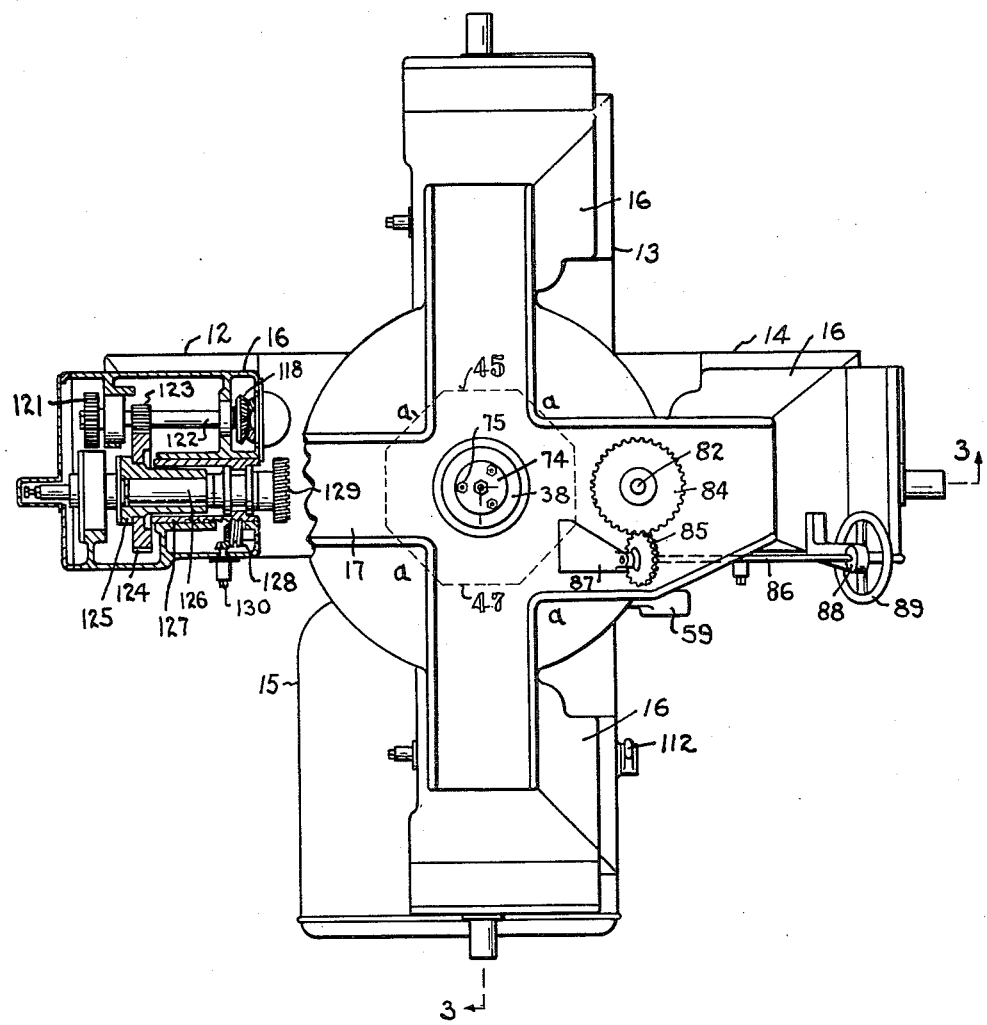
Fig. 2 is a plan view partly broken away to better illustrate the machine.
Figure 3:
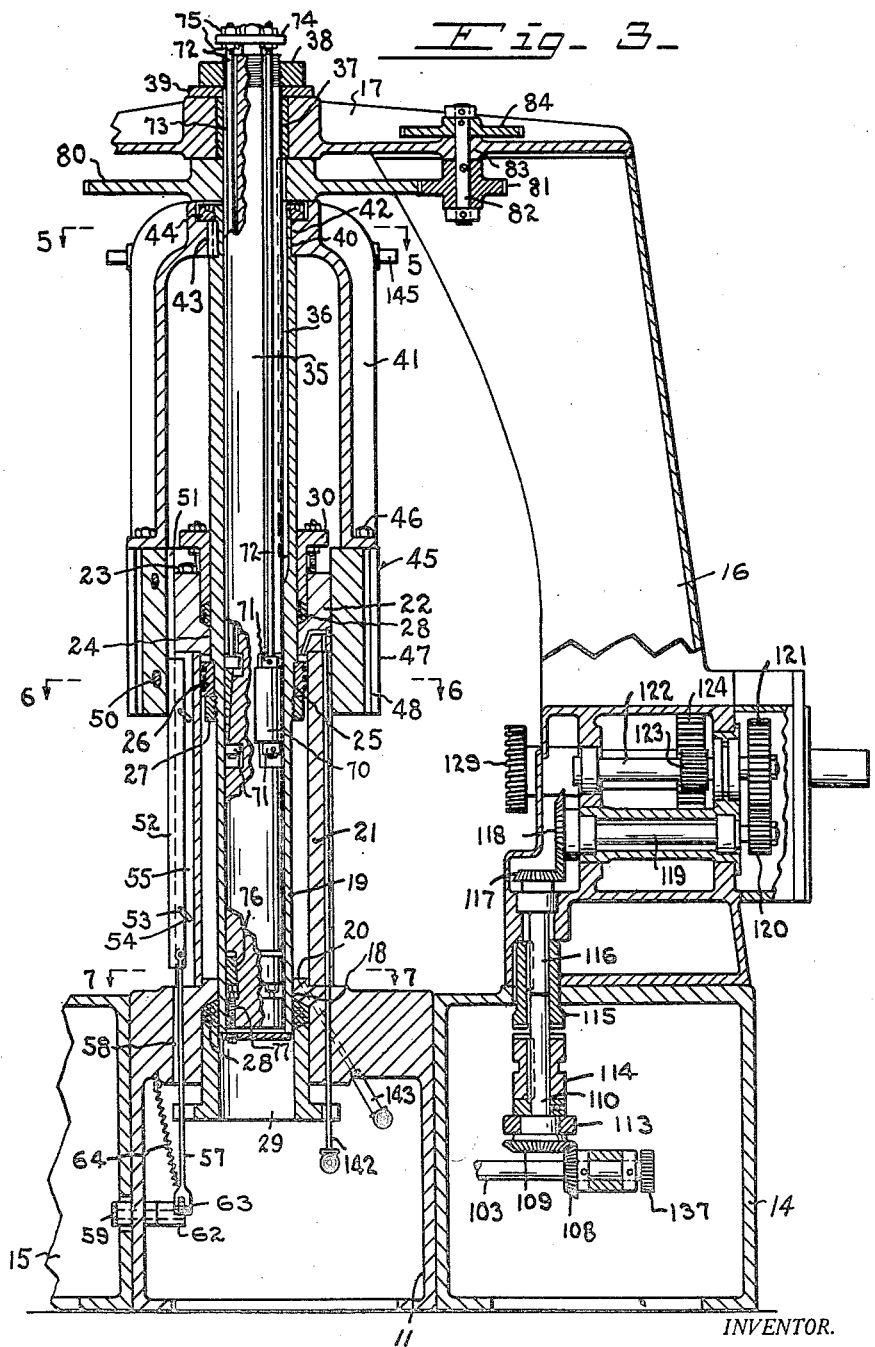
Fig. 3 is a vertical cross-section of the same taken in the plane of the irregular line 3—3 of Fig. 2 and partly broken away.
Figure 4:
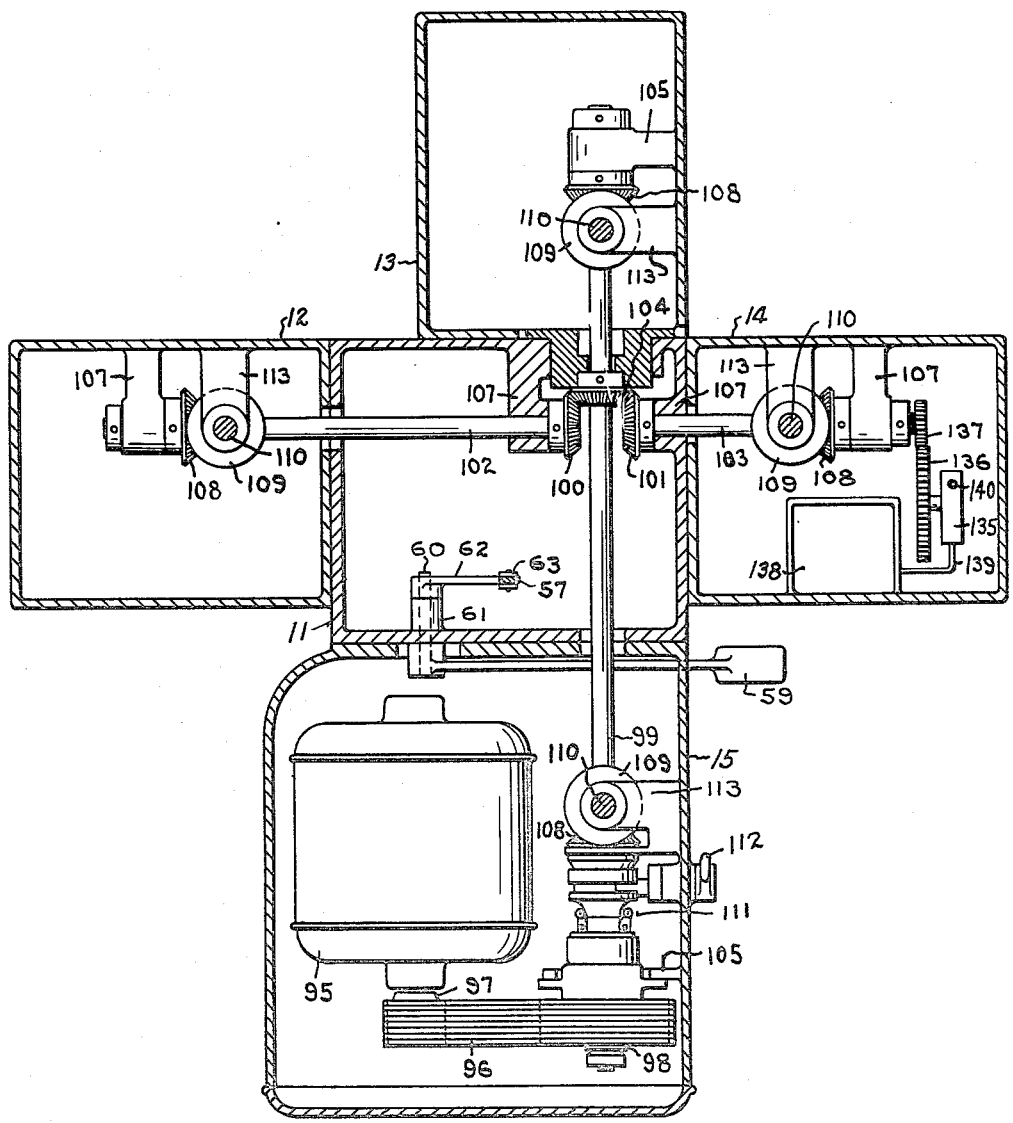
Fig. 4 is a horizontal cross-section, taken in the plane of the line 4—4 of Fig. 1, showing the motor drive connections for the cutters.
Figure 5:
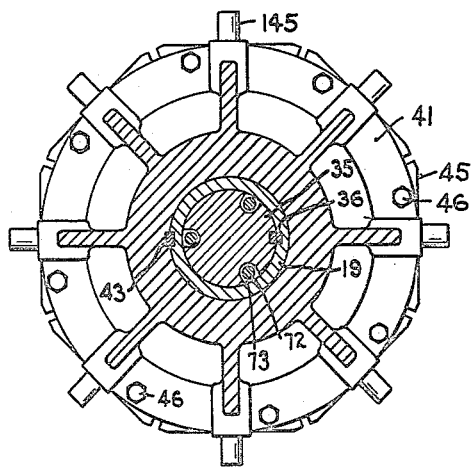
Fig. 5 is a cross-sectional detail, taken on the line 5—5 of Fig. 3.
Figure 6:
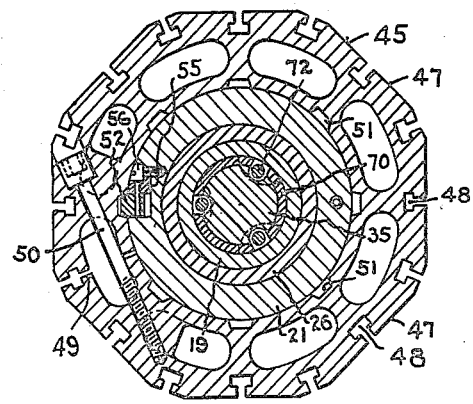
Fig. 6 is a cross-sectional detail taken on the line 6—6 of Fig. 3.
Figure 7:
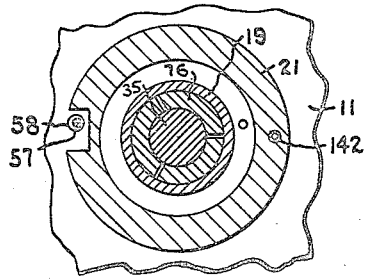
Fig. 7 is a cross-sectional detail taken on the line 7—7 of Fig. 3.

The exemplified machine comprises a central base member 11 and auxiliary base members 12, 13, 14 and 15 suitably secured thereto. Columns 16 extend upwardly from the auxiliary base members and are connected by a head structure 17.

The central base member is provided with a bore 18, in which one end of a sleeve 19 reciprocates. An upwardly extending annular flange 20 on the base 11 positions a cylinder 21 which extends upwardly and has a cap 22 suitably bolted thereto as by bolts 23. The cap 22 forms a bearing 24 for the sleeve 19. The sleeve is reduced as at 25 for positioning a piston 26 which is provided with the usual piston rings. The piston is secured on the sleeve and held thereon by a threaded collar 27 received over a threaded portion of the sleeve. The bearings 18 and 24 are provided with suitable packing 28 and retaining glands 29 and 30 respectively.

A shaft 35 is received in the sleeve 19 and is keyed thereto by means of a spline key and groove connection 36. The upper end of the shaft extends through a bore 37 in the head structure. A nut 38 received over the threaded end of the shaft rests on a washer 39 for suspending the shaft from the head structure.

The upper end of the sleeve 19 is reduced as at 40. A bonnet 41 having a bore 42 received over the reduced portion of the sleeve and keyed thereto by a key 43. A nut 44 is threaded over the end of the sleeve for clamping the bonnet to the sleeve. A work support 45 is bolted to the bonnet by bolts 46. The work support has sliding contact with the outer periphery of the cylinder. The outer periphery of the work support is provided with a plurality of work supporting faces 47 which are provided with T-slots 48, whereby the work or suitable fixtures for holding the work may be secured to the work support. The work support is provided with a split 49 and a pair of adjusting bolts 50, whereby any wear between the cylinder and the work support can be taken up by adjusting the bolts.

The inner periphery of the work support has key-ways 51 central of the plurality of work supporting faces. A key 52 is arranged to engage any one of the keyways for positioning the work support relative to the cutting tools hereinafter described. Pins 53 extend from the key into angular slots 54 in a guide 55 secured to the cylinder as by screws 56. A link 57 is attached to the lower end of the key and extends through a slot 58 in the base. A foot lever 59 is secured to one end of a shaft 60 which is journalled in a bearing 61 in the base. The other end of the shaft has a lever 62 secured thereto. The other end of the lever is articulated at 63 with the link 57. A spring 64 connected to the lever 62 and the base normally maintains the key in engaging relation to the keyways.

Means are provided for adjusting the sliding fit between the shaft and sleeve comprising tapered shoes 70 which are held in adjusted position by collars 71 secured to rods 72 received in grooves 73 in the shaft. The upper ends of the rods are threaded and received through a supporting plate 74, which is secured to a reduced extension of the shaft. Nuts 75 received over the rods below and above the plate hold the rods in adjusted position. The lower end of the shaft 35 has tapered shoes 76 received in recesses in the shaft and supported on adjusting screws 77.

The work support is arranged to be indexed about the cylinder, for which purpose I provide a gear 80 keyed to the shaft 35, below the head structure, which meshes with a gear 81 secured to a shaft 82 journalled in a bearing 83 in the head structure. A spiral gear 84 is secured to the other end of the shaft and meshes with a spiral gear 85 on one end of a shaft 86. The shaft 86 is journalled in bearing brackets 87, 88 and is rotated by means of a hand wheel 89.

Each of the upright columns support a milling cutter and its driving mechanism, which receives its power from an electric motor 95 supported in the auxiliary base 15. A silent chain 96 imparts rotation from a sprocket 97 on the rotor shaft to a sprocket 98 on a shaft 99. A pair of bevel gears 100, 101 fixed to shafts 102, 103 respectively mesh with a bevel gear 104 on the shaft 99. The shaft 99 is suitably journalled in bearings 105 in the base members. The cross shafts 102, 103 are journalled in bearings 107 in the base members. Bevel gears 108 secured to the shafts 99, 102 and 103 mesh with bevel gears 109 secured to upright shafts 110. A suitable clutch 111 is interposed on the shaft 99 and controlled by a lever 112 for interrupting the power train to the cutters.

The upright shafts 110 are journalled in bearings 113 and have a clutch member 114 slidably keyed thereto. A mating clutch member 115 is keyed to a shaft 116 in axial line with the shaft 110. Engagement of the clutch members imparts rotation to a bevel gear 117 secured to the shaft 116. Power is thus transmitted from the gear 117 to a bevel gear 118 fixed to a shaft 119. Gears 120 and 121 are respectively mounted on the shafts 119 and an intermediate shaft 122. The gears 120 and 121 form speed change gears and can be removed and gears with a different ratio secured to the respective shafts for changing the speed of the cutting tool. A pinion 123 on the shaft 122 meshes with a gear 124 attached to a sleeve 125. A shaft 126 has a sliding key connection with the sleeve 125 and is mounted in a sleeve 127. The sleeve 127 is moved endwise by means of a worm 128 meshing with teeth on the sleeve for moving the cutter 129 in desired relation to the work. The worm is rotated by a pair of bevel gears one of which is attached to the worm and the other fixed to a stud shaft 130. The cutter 129 can be secured to the shaft 126 in any desirable demountable way.

Movement is imparted to the work support by means of fluid under high pressure. A pump 135 is driven by means of a gear 136 meshing with a gear 137 on the shaft 103. An oil reservoir 138 adjacent to the pump supplies the pump with fluid through a pipe 139. The oil is pumped through a pipe 140 to a control valve 141 on one of the columns, which is provided with ports for changing the flow to either end of the cylinder through the pipes 142, 143.

Movement of the work support will be arrested upon contact of the engaging lugs 145 on the bonnet with the adjustable stops 146 on a slide 147. A link 148 connects the slide with a rock shaft 149, to which a lever 150 is attached. A link 151 connects the lever 150 and the hand control lever 152 of the valve. A rod 153 extending from the rock shaft supports a counter weight 154 for counter balancing the slide 147.

Figure 8:
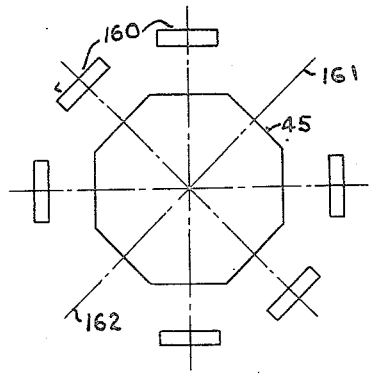
Figs. 8 and 9 are diagrammatic views showing various relations of cutters to the work support.

The machine exemplified is an eight station type machine with four cutting positions and four loading positions. In the modification shown in Fig. 8, I have shown a diagrammatic arrangement wherein there are six cutter positions 160 and two loading positions 161, 162. This arrangement is adapted for a plurality of operations on a piece of work. The work is loaded on the machine at 162 for successive operations upon a piece of work.

Figure 9:
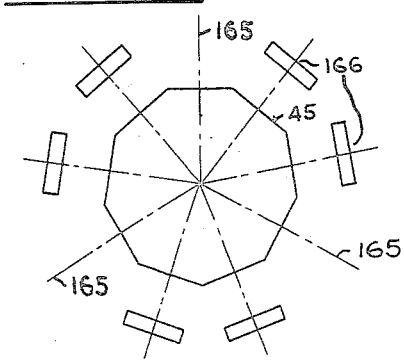

In Fig. 9, I have shown an arrangement with three loading positions 165 with a pair of cutters 166 between each such loading position whereby two operations may be performed on each piece of work and three such pieces being acted upon at the same time.

In the operation of my machine the work is loaded on the work support at the positions $a$ intermediate the cutters. The work support is then indexed one-eighth revolution to present the work in a position to be acted upon by the cutters, the lever 152 is moved to set up a connection in the valve for forcing fluid from the pump to the top of the cylinder causing the piston to slowly descend, moving the sleeve and the work support therewith. While this operation is being performed, pieces of work may be loaded on the work support at the positions $a$. Upon completion of the downward stroke, the work support is again indexed one-eighth revolution to bring the work that has just been mounted on the machine in position to be acted upon by the cutters. The lever 152 is then moved in the opposite direction to set up the flow of liquid to the bottom of the cylinder for causing the piston, sleeve and work support to move upwardly and the work to be acted upon by the cutters. While the work support is moving upwardly, the finished pieces that were acted upon on the down stroke can be removed and others put in their places to be acted upon on the next down stroke.

The lugs 145 on the bonnet engaging the adjustable stops 146 returns the valve to a neutral position at the end of each stroke for stopping the movement of the work support.

Having thus fully described my invention what I claim as new and desire to secure by Letters Patent, is:

1. A milling machine comprising a base, a plurality of tool supporting columns extending upwardly from said base, a head structure connecting said columns, a shaft hung from said head structure, a vertical work support reciprocable on said shaft, a cylinder extending upwardly from said base about said shaft, a piston on said work support received in said cylinder, hydraulic means for operating said piston, means for indexing said work support and means for locking said work support in indexed position.

2. In a milling machine the combination of a base, a plurality of columns extending upwardly from said base, a head structure connecting said columns, horizontal tool mechanism carried by said columns, a vertical reciprocatory work support central said columns, a cylinder extending upwardly from said base, a shaft hung from said head structure, said work support mounted on said shaft, a piston on said work support and hydraulic means for imparting endwise movement to said work support, and means for indexing said work support.

JOHN S. MONTAINE.